United States Patent [19]

Chou

[11] Patent Number: 5,889,072
[45] Date of Patent: Mar. 30, 1999

US005889072A

[54] PROCESS FOR PREPARING SUPERABSORBING CROSSLINKED POLYASPARTATE SALT

[75] Inventor: Yueting Chou, Chesterfield, Mo.

[73] Assignee: Solutia Inc., St. Louis, Mo.

[21] Appl. No.: 804,859

[22] Filed: Feb. 24, 1997

[51] Int. Cl.⁶ ............... C08G 73/10; C08G 69/10; C08J 9/00; C08J 9/28
[52] U.S. Cl. ............... 521/183; 521/184; 521/189; 528/182; 528/183; 528/322; 528/328; 528/363
[58] Field of Search ................... 521/183, 184, 521/189; 528/328, 363, 322, 182, 183

[56] References Cited

U.S. PATENT DOCUMENTS

| | | | |
|---|---|---|---|
| 4,332,928 | 6/1982 | Kluger et al. | 528/113 |
| 4,434,228 | 2/1984 | Swann | 435/108 |
| 4,556,689 | 12/1985 | Murakami et al. | 525/54.1 |
| 4,803,168 | 2/1989 | Jarvis, Jr. | 435/240.22 |
| 5,057,597 | 10/1991 | Koskan | 528/328 |
| 5,062,980 | 11/1991 | Migdal et al. | 252/51.5 |
| 5,142,062 | 8/1992 | Knebel et al. | 548/545 |
| 5,247,068 | 9/1993 | Donachy et al. | 530/350 |
| 5,284,936 | 2/1994 | Donachy et al. | 530/350 |
| 5,288,783 | 2/1994 | Wood | 525/418 |
| 5,315,010 | 5/1994 | Koskan et al. | 548/520 |
| 5,319,145 | 6/1994 | Paik et al. | 528/328 |
| 5,461,085 | 10/1995 | Nagatomo et al. | 521/183 |
| 5,478,919 | 12/1995 | Koskan et al. | 528/363 |
| 5,484,945 | 1/1996 | Nagatomo et al. | 548/520 |
| 5,525,682 | 6/1996 | Nagatomo et al. | 525/420 |
| 5,525,703 | 6/1996 | Kalota | 528/363 |
| 5,552,516 | 9/1996 | Ross et al. | 528/363 |
| 5,552,517 | 9/1996 | Martin | 528/363 |
| 5,612,384 | 3/1997 | Ross et al. | 521/64 |
| 5,650,270 | 7/1997 | Giese et al. | 435/6 |

FOREIGN PATENT DOCUMENTS

| | | |
|---|---|---|
| 0387346 | 6/1995 | European Pat. Off. . |
| 0658586 | 6/1995 | European Pat. Off. . |
| 0683231 | 11/1995 | European Pat. Off. . |
| 0693557 | 1/1996 | European Pat. Off. . |
| 93004400 | 6/1984 | Japan . |
| 759545 | 8/1980 | U.S.S.R. . |
| WO93/20856 | 10/1993 | WIPO . |

OTHER PUBLICATIONS

Journal of Controlled Release, 29 (1994) 63–72 "A New Water–Soluble Synthetic Polymer, α, β–Polyasparthydrazide, as Potential Plasma Expander and Drug Carrier", 1994 Elsevier Science B.V. by G. Giammona, et al.

Journal of Bioactive and Compatible Polymers, pp. 28–40, vol. 10—Jan. 1995 "Crosslinked α, β–Polyasparthydrazide Micromatrices for Controlled Release of Anticancer Drugs" by G. Giammona, et al.

Colloid & Polymer Science, 272:1637–1641 (1994) "Synthesis and Characterization of Water–Swellable α, β–Polyasparthydrazide Derivatives" by G. Giammona, et al.

Journal of Controlled Release, Official Journal of the Controlled Release Society, 1966 vol. 41 Issues 1 and 2, pp. 195–203, Accepted Dec. 8, 1995 "Crosslinked α, β–Polyasparthydrazide Hydrogels: Effects of Crosslinking Degree and Loading Method on Cytarabine Release Rate" by G. Giammona, et al.

Mat. Res. Soc. Symp. Proc., vol. 292, 1993 Materials Research Society, pp. 277–283, "Large Scale Thermally Synthesized Polyaspartate as a Biodegradable Substitute in Polymer Applications" by A.P. Wheeler and L.P. Koskan.

Journal of Polymer Science, Polymer Letters Edition, Dec. 1982, vol. 20, No. 12, pp. 621–627, "Addition Polyimides. II. Polyaspartimide Oligomers" by John Wiley & Sons, Inc., by I. K. Varma, et al.

Bollettino Chimico Farmaceutico, Fondato da P. Viscardi nel 1861, Rivista di Scienze Farmaceutiche e Biologiche, 1993 vol. 132 Issue 2, 2 Febbraio 1993, "Forza Di Rigonfiamento E Proprieta Di Derivati Polisuccinimmidici" by G. Massimo [Massimo et al., *Swelling Force and Properties of Polysuccinimide Derivatives, Boll. Chim. Farm.* (1993), 123(2) pp. 43–44].

*Primary Examiner*—Morton Foelak
*Attorney, Agent, or Firm*—Fitzpatrick, Cella, Harper & Scinto

[57] ABSTRACT

A process for preparing superabsorbing crosslinked polyaspartate salt by reacting crosslinked polysuccinimide having a weight average molecular weight of at least 20,000 Daltons with neat base or aqueous base wherein the ratio of water to crosslinked polysuccinimide is zero or positive up to about 10, preferably about 3.3. The resulting salt is either a solid or paste.

7 Claims, No Drawings

PROCESS FOR PREPARING SUPERABSORBING CROSSLINKED POLYASPARTATE SALT

BACKGROUND OF THE INVENTION

This invention relates to a process for preparing crosslinked polyaspartate salt.

Crosslinked polyaspartate salt (PAS) has an important industrial superabsorbing property making it useful in applications such as thickeners, flocculants, absorbers and the like. As noted in U.S. Pat. No. 5,461,085 to Nagatomo et al, for effective superabsorption of many times its own weight, the polysuccinimide (PSI) precursor for the salt should have a molecular weight (Mw) of at least 20,000. PAS is prepared by hydrolyzing crosslinked PSI with aqueous base. In conducting such hydrolysis, the high molecular weight, crosslinked PAS particles absorb whatever water is capable of being held to create a gel. To insure that the gel is well distributed for thorough, efficient hydrolysis reaction of uncrosslinked succinimide rings with base, it was conventional in the prior art to use a large excess of water. Hydrolysis was considered complete when the gel could not consume further base at pH 9–11, 60° C. Note the Examples of U.S. Pat. No. 5,525,682 to Nagatomo et al where (col. 5, line 23) the polymer concentration during hydrolysis is 0.5 to 10 wt. % This water must eventually be removed, typically by evaporation, to form dry, crosslinked PAS since it will likely be used in this form in commercial applications—e.g. between layers of a diaper. It would be desirable to simplify the process of preparing and recovering such high molecular weight, crosslinked polyaspartate salt.

SUMMARY OF THE INVENTION

Now improvements have been made to simplify the process of fording salt of high molecular weight, crosslinked polyaspartate.

Accordingly, a principal object of this invention is to simplify processes for preparing high molecular weight polyaspartate salts.

Other objects will in part be obvious and will in part appear from the following description and claims.

These and other objects are accomplished by providing a process for preparing crosslinked polyaspartate salt which comprises reacting crosslinked polysuccinimide having a weight average molecular weight of at least 20,000 (preferably 30,000) Daltons with neat base or aqueous base wherein the ratio of water to crosslinked polysuccinimide is zero or positive up to or about 10, preferably up to or about 3.3. Operating within this ratio provides salt either as a solid (using neat base) or paste without forming a solution of the salt in water yet, when dry, such salt has absorbing properties comparable to those of salt recovered from an aqueous solution of the salt. Preferably the only water is that present in the base solution, the base serving to hydrolyze succinimide rings of the PSI not crosslinked in the PSI crosslinking reaction.

DETAILED DESCRIPTION OF THE INVENTION

According to this invention it is unnecessary to use large quantities of water in the hydrolysis reaction between base and uncrosslinked succinimide rings of partially crosslinked high molecular weight PSI. This substantial absence of water is defined by the water to crosslinked PSI ratio in the hydrolysis reaction, which is 0 with neat (i.e. free from admixture or dilution with water) base but preferably is positive up to or about 10, most preferably up to or about 3.3. This is contrary to the prior art belief that crosslinked high molecular weight PSI and absorbed water in the form of a gel had to be kept mobile as a well-mixed dispersion in substantial water to optimize hydrolysis of the succinimide rings. As will be shown, elimination of this excess water does not significantly adversely effect the absorbent property of the final crosslinked, high molecular weight hydrolyzed polyaspartate salt product. This process simplification avoids having to drive off this excess water when forming the final commercial solid superabsorbing PAS product. Moreover, when some minor quantity of water (within the noted 10/1 ratio) is used and the resulting high molecular weight salt is in paste form, if alcohol such as methanol is (optionally) added to the paste during PAS recovery to precipitate the salt from the water, significantly less alcohol is required than where a large quantity of water is present as when the salt is in water solution. In the latter case about 3 to 5 parts alcohol/part $H_2O$ is generally used. This reduction is because the alcohol is displacing water absorbed by the high molecular weight crosslinked salt and the amount of alcohol is therefore proportional to the amount of water being displaced. Alcohol treatment, however, is avoided altogether by directly drying the paste without first precipitating the salt.

Though neat, anhydrous base (e.g. caustic) can be used which contains no water or at most only moisture absorbed from the atmosphere, as well as concentrated base (e.g. 50 or more weight % in water) these may adversely effect the polymer insofar as partially depolymerizing the crosslinked PSI precursor during reaction with the base. It is therefore preferred to use dilute base of about 5–20 weight % concentration in water.

PSI is conventionally formed by condensation polymerization of L-aspartic acid in the presence of catalyst such as phosphoric acid. Processes for preparing PSI are described in U.S. Pat. No. 5,057,597; U.S. Pat. No. 5,315,010 and U.S. Pat. No. 5,319,145. To provide a commercially significant polyaspartate polymer which is capable of absorbing many times its own weight of liquid such as water or saline solution, the molecular weight (weight average Mw) of the precursor PSI polymer must be at least 20,000, preferably at least 30,000 Daltons. Such high molecular weight is achieved by driving the polycondensation reaction to as complete a level as commercially feasible by using catalyst concentrations, reaction temperature and times on the high side of the ranges disclosed in these prior art patents. It is also important for high molecular weight to remove water of condensation from the reaction medium as it is formed. This is taught in U.S. Pat. No. 5,484,945 to Nagatomo et al, the disclosure of which is incorporated herein by reference. A preferred procedure providing the high molecular weight PSI associated with this invention carries out the polycondensation reaction at reduced pressure and 180° C. in the presence of 85% phosphoric acid as described in U.S. Pat. No. 5,142,062 (Knebel et al) the disclosure of which is also incorporated herein by reference.

Any crosslinker is usable which is effective to crosslink succinimide rings of high molecular weight polymeric PSI sufficiently to cause the subsequent salt to absorb significant liquid. Suitable crosslinkers are disclosed in U.S. Pat. No. 5,525,703 (Kalota) describing triaminononane and U.S. Pat. No. 5,525,682 (Nagatomo et al) describing diamines such as hexamethylene diamine. The crosslinking disclosures of these patents are incorporated herein by reference.

Crosslinking is typically carried out in solution by dissolving uncrosslinked PSI in solvent such as dimethyl formamide and then incrementally adding a second solution of the crosslinker over time to the first solution, typically at about room temperature or up to about 50° C. The degree of crosslinking is controlled by the type and amount of crosslinker used in the reaction with high molecular weight PSI. This is defined by the mole ratio of PSI to crosslinker which is typically from about 2.5 to 50 and preferably about 3 to about 20.

The reaction forming polyaspartate salt from crosslinked high molecular weight PSI and base such as metal (e.g. sodium or potassium) hydroxide is carried out at less than 100° C.—e.g. at room (i.e. about 25° C.) temperature.

The invention is further described in the following Examples which are not intended to limit or restrict the invention. Unless otherwise indicated, quantities and percentages are expressed in weight.

The tea bag test referred to in the Examples to measure superabsorbence is conducted as follows: 0.2 g of a sample is placed in a tea bag-like pouch (2"×2") of nonwoven fabric and heat sealed. The tea bag is subjected to a 15 second immersion in a 0.9% saline solution, one minute drip dry and weighing, followed by a 2 min. 45 sec. immersion, one min. drip dry and weighing, and then an additional 7 min. immersion, one min. drip dry and weighing. The absorbencies for 15 seconds, 3 minutes and 10 minutes are calculated according to the following equation and the 10 min. result reported as superabsorbing performance. Absorbency in g/g=(weight of the tea bag with treated sample minus weight of a wet empty tea bag)/0.2.

EXAMPLE 1

A) Preparation of Crosslinked PSI

To a 500 cc three neck reaction flask equipped with mechanical stirrer, thermometer, addition funnel and heating mantle are charged 200 cc dimethyl formamide (DMF) and 5.01 gm (0.0507 mole) of polysuccinimide having a weight average molecular weight of 38,000 Daltons measured by gel permeation chromatography (GPC). The flask contents are heated to 50° C. with agitation to ensure dissolution. A solution of 0.34 gm (0.0107 mole) hydrazine crosslinker in 5 cc DMF is added to the flask and the reaction mixture stirred at room temperature overnight. Mole ratio of PSI/crosslinker is 4.7. Then 2.13 gm (0.0244 mole) triethylamine is added (to neutralize any HCl generated from the reaction) and after 30 min. 2.11 gm (0.014 mole) terephthaloyl chloride (TPC) in 5 cc DMF is charged. During TPC addition gel is formed and 150 cc DMF is further added. The mixture is held at 28° C. for 1 hour and then DMF is stripped away using a rotary vacuum evaporator to provide about 11 gm of flakes which is washed with water and methanol and dried in a vacuum oven to provide high molecular weight crosslinked PSI. In this crosslinking reaction, PSI rings are opened with hydrazine and the open hydrazide is bridged or crosslinked with the diacyl chloride. This crosslinking is further described in commonly assigned copending U.S. application (Atty. Docket No. 43-21-11451) for—Crosslinked Polyaspartate and Polyaspartate Salts And Process For Their Production, by Y. Chou et al.

B) Conventional Preparation of Polyaspartate Salt In Water (Control)

One gram (about 0.0103 mole) of crosslinked high molecular weight PSI from A) above is taken for hydrolysis and stirred in 100 cc water while gradually heating to 60° C. About 3.30 cc 10% (0.0082 mole) caustic solution is added and the pH controlled at 10.8–11.0. Water to crosslinked PSI weight ratio is 103. After caustic addition the final pH is about 11 and the mixture appears as a thick, cloudy suspension of small hydrolyzed particles which is filtered through a fritted disc funnel under suction leaving a gel on the funnel of particles containing absorbed water. This gel is added to 300 cc methanol to precipitate out a yellow solid as the sodium salt of crosslinked polyaspartate. It is filtered and dried in a vacuum oven to give 0.95 gms of dry superabsorbing product (SAP) which, in the tea bag test absorbs 22.5 gm saline solution per gm of SAP.

C) Preparation of Polyaspartate Salt Using Low and No Water

This is according to the invention. 0.5 gm (ca. 0.0052 mole) of the crosslinked high molecular weight PSI from A) above is ground in a mortar and pestle for about 10 min. while 1.3 cc 10% NaOH (0.0033 mole) is added. The water/crosslinked PSI ratio is 2.6. A white paste is formed which is essentially more a product of the reactants in comparison with the gel in B) above since some water (i.e. from the 10% caustic solution) is absorbed but less than what could be absorbed with a greater amount present. The solids concentration of hydrolyzed, crosslinked salt in the paste is relatively high at about 35%. It is transferred to a fritted disc funnel and mixed several times with methanol. The white, gummy solid is dried in a vacuum oven and 0.42 gm of dry SAP product is collected which, in the tea bag test, absorbed 19 gms saline solution per gm SAP. Thus, reducing the water/crosslinked PSI weight ratio by about 98% from that in B) above does not significantly decrease the superabsorbing capability of the high molecular weight crosslinked PSI salt.

1 gm (ca 0.0103 mole) of the PSI from A) above is ground with 0.32 gm (0.008 mole) of neat, anhydrous, premilled NaOH powder (from pellets) in a mortar and pestle for about 10 min. under nitrogen. Water/crosslinked PSI ratio is 0. About 1.1 gm yellow solid is recovered which absorbs 11 gm saline solution per gm SAP in the tea bag test. Performance is reduced over that in B) using dilute liquid caustic but the salt is still capable of superabsorbing 11 times its own weight.

EXAMPLE 2

This illustrates the effect of molecular weight of crosslinked PSI on absorption performance.

A) To a 1 liter, four-necked round bottom reaction flask equipped with mechanical stirrer, thermometer, addition funnel, and heating mantle is charged 10 gm (0.1031 mole) of polysuccinimide (PSI) with a molecular weight of 66000 and 400 cc DMF. The contents are heated to 40° C. with agitation to ensure total dissolution. Then 0.40 gm (0.0125 mole) hydrazine in 10 cc DMF is added at room temperature and the mixture is stirred at room temperature for 2.5 hours. Then 2.48 gm (0.0245 mole) terephthaloyl chloride in 6 cc DMF is added dropwise. Gel is formed gradually and becomes thicker as the reaction progresses. The thick cloudy mixture is stirred at about 26° C. for 1.5 hour and then DMF is stripped off under vacuum. About 21.6 gm solid is collected, ground and washed with cold water several times to remove triethylamine hydrogen chloride salt. The solid is dried in a vacuum oven at 60° C. and 11.54 gm product is collected. 2.0 gm (ca. 0.0206 mole) of the crosslinked polymer is suspended in 300 cc water at about 50° C., to which 7.4 cc 10% (0.0103 mole) NaOH solution is added dropwise while controlling pH around 11. After addition, it is cooled to room temperature and filtered through a fritted funnel. Only a small amount of filtrate is collected (most water being absorbed) leaving a light gel formed on the funnel. The gel is charged to stirred methanol (1.5 liters) and a gray gummy ball of crosslinked sodium polyaspartate is formed which is ground and dried in a vacuum oven. About 2.07 gm SAP is obtained. One gram of this SAP absorbs 51 gm saline solution or 138 gm water in the tea bag test.

B) The crosslinking procedure of A) above is repeated except using PSI having a molecular weight of 11,000. 11.52 gm crosslinked PSI is produced. The hydrolysis procedure of A) above is repeated. No gel is formed (little or no water absorbed); the solution is concentrated under vacuum to about 10 ml which is treated with methanol to form precipitate which is dried in a vacuum oven. This low molecular weight crosslinked polyaspartate salt shows very little absorbency of saline solution at less than 2 gm per gm of salt in the tea bag test.

From the above, a molecular weight of at least 20,000 Daltons is required to provide adequate, commercially important absorbing properties in which the process improvement of the invention is useful.

The preceding description is for illustration and should not be taken as limiting. Various modifications and alterations will be readily suggested to persons skilled in the art. It is intended, therefore, that the foregoing be considered as exemplary only and that the scope of the invention be ascertained from the following claims.

I claim:

1. A process for preparing superabsorbing crosslinked polyaspartate salt which comprises reacting crosslinked polysuccinimide having a weight average molecular weight of at least 20,000 Daltons with neat base or aqueous base solution wherein the weight ratio of water to crosslinked polysuccinimide is zero to about 6.

2. The process of claim 1 wherein the ratio is positive but does not exceed about 3.3.

3. The process of claim 2 wherein the crosslinked polysuccinimide is reacted with aqueous base solution.

4. A process for preparing superabsorbing, crosslinked polyaspartate salt in paste form which comprises reacting succinimide groups of polysuccinimide polymer having a weight average molecular weight of at least 30,000 Daltons with crosslinker to form crosslinked polysuccinimide and subsequently reacting uncrosslinked succinimide groups of the polysuccinimide with aqueous base solution wherein the ratio of water to crosslinked polysuccinimide is positive up to about 3.3 to form said paste.

5. The process of claim 4 wherein the crosslinker is triaminononane.

6. In the process for preparing superabsorbing, crosslinked polyaspartate salt by reacting succinimide groups of polysuccinimide polymer having a weight average molecular weight of at least 30,000 Daltons with crosslinker to form crosslinked polysuccinimide and reacting other uncrosslinked succinimide groups of the polysuccinimide with aqueous base solution, to hydrolyze such other uncrosslinked succinimide groups, the improvement wherein during the hydrolysis reaction the water to crosslinked polysuccinimide weight ratio is positive up to about 6.

7. The process of claim 6 wherein the ratio is up to about 3.3.

* * * * *